(12) United States Patent
Nogami

(10) Patent No.: US 7,478,207 B2
(45) Date of Patent: Jan. 13, 2009

(54) CONTROL SYSTEM WITH A WRITE FILTER FOR PROTECTION OF DATA

(75) Inventor: Taishi Nogami, Matsumoto (JP)

(73) Assignee: Seiko Epson Corporation (JP)

( * ) Notice: Subject to any disclaimer, the term of this patent is extended or adjusted under 35 U.S.C. 154(b) by 335 days.

(21) Appl. No.: 11/357,797

(22) Filed: Feb. 17, 2006

(65) Prior Publication Data

US 2006/0195671 A1    Aug. 31, 2006

(30) Foreign Application Priority Data

Feb. 25, 2005    (JP)    ............................... 2005-050873

(51) Int. Cl.
*G06F 12/00*    (2006.01)
(52) U.S. Cl. ...................... 711/154; 711/163
(58) Field of Classification Search .................. 711/154
See application file for complete search history.

(56) References Cited

U.S. PATENT DOCUMENTS

| 6,484,290 | B1 |  | 11/2002 | Chien et al. |
| 7,082,495 | B2 | * | 7/2006 | DeWhitt et al. ............. 711/113 |
| 2003/0221083 | A1 |  | 11/2003 | Hill et al. |
| 2005/0005076 | A1 | * | 1/2005 | Lasser ......................... 711/154 |
| 2005/0027957 | A1 |  | 2/2005 | Page et al. |

FOREIGN PATENT DOCUMENTS

| EP | 0 564 699 | 10/1993 |
| JP | 10-015836 | 1/1998 |
| JP | 2002-036157 | 2/2002 |
| JP | 2002-351504 | 12/2002 |
| WO | 2004-025476 | 3/2004 |

OTHER PUBLICATIONS

Bach, M. J., "The Design of the Unix Operating System, Passage", 1986, Englewood Cliffs, Prentice Hall, U.S., XP002482468, p. 53-56, figure 3.15, Section 5.3 "Write": p. 101-103.

* cited by examiner

*Primary Examiner*—Kevin L Ellis
*Assistant Examiner*—Matthew Bradley
(74) *Attorney, Agent, or Firm*—Harness, Dickey & Pierce, P.L.C.

(57) ABSTRACT

A control system configured to control a predetermined unit by using a control program running on a general-purpose OS. The control system includes an auxiliary storage device configured to store the general-purpose OS, the control program, and various data items required for the control program to run, and a main storage device on which each of the general-purpose OS and the control program are loaded when they are executed. The entire auxiliary storage device is constituted by a silicon disk, or by a hard disk and the silicon disk.

8 Claims, 6 Drawing Sheets

CONTROL SYSTEM WITH A WRITE FILTER FOR PROTECTION OF DATA

The entire disclosure of Japanese Patent Application No. 2005-050873, filed Feb. 25, 2005, is expressly incorporated by reference herein.

BACKGROUND OF THE INVENTION

1. Field of the Invention

The present invention relates to a control system wherein a control program adapted to control a control object runs on a general-purpose operating system (OS).

2. Description of the Related Art

In recent years, low-priced and multifunctional general-purpose operating systems with a network capability and a multi-task capability have been available. There have been proposed technologies achieving reduction of the number of man-hours and cost of developing a control system configured to control a predetermined control object such as a robot by using the above-described general-purpose OS for the control system. One of the above-described technologies is disclosed in Japanese Unexamined Patent Application Publication No. 10-15836, for example.

According to the technology disclosed in Japanese Unexamined Patent Application Publication No. 10-15836, a large quantity of data is handled. Therefore, a hard disk (a magnetic-disk device) is used, as a storage device. The hard disk is sensitive to a physical shock and/or a physical vibration. Further, in view of software, the hard disk has a file system apt to break by power shutdown that occurs when data is changed. Therefore, it is difficult to achieve a reliable control system including the hard disk, as a storage device configured to store a control program or the like.

SUMMARY

It is an advantage of some aspects of the present invention to provide a highly reliable control system that reduces loss of data by using a highly reliable storage device.

A control system according to an aspect of the present invention is configured to control a predetermined unit for control by using a control program running on a general-purpose operating system. The control system includes an auxiliary storage device configured to store the general-purpose operating system, the control program, and various data required for the control program to run and a main storage device on which each of the general-purpose operating system and the control program is loaded when the general-purpose operating system and the control program are executed. The auxiliary storage device includes non-volatile solid-state memory.

Thus, the control system includes the non-volatile solid-state memory with reliability higher than that of a magnetic-disk device. Therefore, the control system can reduce loss of data and achieve high reliability.

Further, a control system according to another aspect of the present invention is configured to control a predetermined unit by using a control program running on a general-purpose operating system. The control system includes an auxiliary storage device configured to store at least the general-purpose operating system, the control program, and various data required for the control program to run, and a main storage device on which each of the general-purpose operating system and the control program is loaded when the general-purpose operating system and the control program are executed. The auxiliary storage device includes non-volatile solid-state memory functioning as a protected area and a magnetic-disk device functioning as a non-protected area. Further, at least various function programs of the general-purpose operating system, where the various function programs are required for the control program to run on the general-purpose operating system, and the control program are stored in the protected area, as protected data.

In view of reliability, it is preferable that the entire auxiliary storage device is constituted by the non-volatile solid-state memory in place of the magnetic-disk device. However, if it is difficult to use the non-volatile solid-state memory in reality due to problems of the storage-capacity and cost of developing the control system, the control system may be configured as described above. Thereby, it becomes possible to construct a highly reliable control system that can solve the above-described problems.

Preferably, the above-described control system further includes a write-filter storage means configured to write and/or read data under the control of a write filter of the general-purpose operating system, and control means configured to perform control so that the data is not written into the protected area, but written into the write-filter storage means by using the write filter. When a mode set at the time of writing operation of the data into the protected area is manager mode in which an authorized user can operate writing, the control means writes the data written into the write-filter storage means into the protected area via the write filter, provided that a predetermined condition is fulfilled.

Thus, the control means bypasses the protected area and writes the data into the write-filter area in reality by using the write filter. Therefore, if the power is shut down when data is rewritten and the rewritten data is corrupted, initial data that has been stored before the data rewriting is performed is protected or maintained in the protected area. Therefore, when the power is turned on again, the control system can operate on the basis of the data maintained in the protect area.

Further, the control system is configured so that the user cannot rewrite the protected data (to write data into the protected area) in any mode other than the manager mode. Therefore, it becomes possible to reduce the risk of an ordinary user rewriting the protected data by mistake.

Preferably, the above-described control system further includes a table that can be rewritten by the user. In the table, an item of data and information showing whether the data corresponding to the data item should be stored in the protected area or the non-protected area are set. The control unit determines a destination of the data to be written with reference to the table according to the data item corresponding to the data to be written at the time of writing operation.

Thereby, the user can arbitrarily designate data, as the protected data, or the non-producted data. That is to say, the user can freely customize data according to the form in which the control system is used.

Preferably, in the above-described control systems, the write-filter storage means is a filter area provided in the main storage device constituted by volatile memory.

Thereby, if data is written into the write-filter storage means by mistake, the contents of the written data can be deleted by shutting down the power. Subsequently, when the control system is started next time, the control system can operate on the basis of data stored in the protected area.

Thereby, in the above-described control system, at the time of reading operation, the control means determines whether or not the data to be read has been written into the write-filter storage means. If it is determined that the data to be read has been written into the write-filter storage means, the control means read the data to be read from the write-filter storage means. If it determined that the data to be read has not been written into the write-filter storage means, the control means reads the data to be read from the protected area.

Preferably, in the above-described control system, the non-volatile solid-state memory includes a flash read-only memory (ROM). That is to say, the flash ROM may be used, as the non-volatile solid-state memory.

Preferably, in the above-described control system, the unit to be controlled is a robot. Thereby, it becomes possible to construct a highly reliable robot-control system that achieves the above-described advantages.

DESCRIPTION OF THE PREFERRED EMBODIMENTS

Hereinafter, a control system according to an embodiment of the present invention will be described. More specifically, the control system of this embodiment will be described, as a robot-control system 10, for example. The robot-control system 10 includes a robot, as a unit to control.

Figure 1:
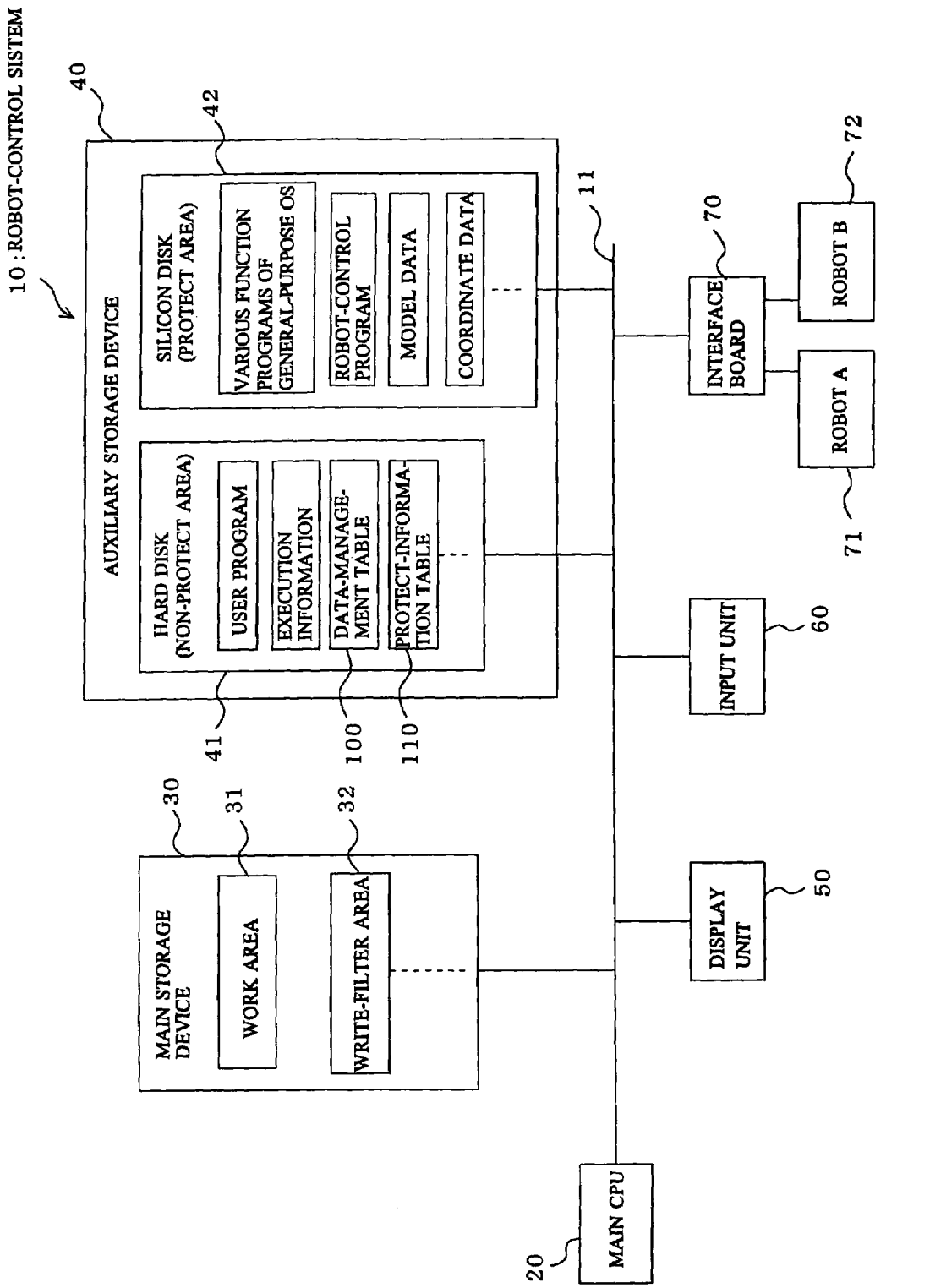
FIG. 1 is a block diagram illustrating the configuration of a robot-control system according to an embodiment of the present invention.

FIG. 1 is a block diagram illustrating the configuration of the robot-control system 10 including a main CPU 20, a main storage device 30, an auxiliary storage device 40, a display device (a cathode-ray tube (CRT), a liquid-crystal display, and so forth) 50, an input device (a mouse, a keyboard, and so forth) 60, and an interface board 70 that are connected to one another via a bus 11. Further, a plurality of robots is connected to the interface board 70. In this embodiment, a robot A 71 and a robot B 72 are connected to the interface board 70.

The main storage device 30 is provided, as random-access memory (RAM), which is volatile memory. The main storage device 30 includes a work area 31 which is used, as a load area when various programs of a general-purpose operating system (OS) and a robot-control program that are stored in the auxiliary storage device 40 are executed. The various programs of the general-purpose OS and the robot-control program will be described later. The main storage device 30 further includes a write-filter area 32 wherein data writing and data reading are controlled by a write filter that will be described later.

The auxiliary storage device 40 includes a hard disk 41 having the same configuration as that of known hard disks, a silicon disk (flash ROM) 42 provided, as nonvolatile solid-state memory. Namely, in this embodiment of the present invention, the nonvolatile solid-state memory, which is highly resistant to a shock, a vibration, and so forth when compared to the known hard disks (magnetic disk device), is used, as the auxiliary storage device 40 in place of the hard disk. Thereby, a reliability problem that occurs due to the use of the hard disk is solved.

However, in reality, replacing the entire hard disk with the non-volatile solid-state memory is difficult due to the storage-capacity problem and/or the cost problem. Therefore, in this embodiment, the auxiliary storage device 40 includes the hard disk 41 and the silicon disk 42, as described above, and data (including a program) that needs to be protected with reliability, so as to construct the robot-control system 10 with high reliability (hereinafter referred to as protected data), is recorded onto the silicon disk 42, and other data (hereinafter referred to as non-protected data) is recorded onto the hard disk 41. Subsequently, the robot-control system 10 with high reliability can be achieved and the storage-capacity problem and the cost problem can be solved. Since the protected data can be recorded onto the silicon disk 42, the silicon disk 42 is referred to as a protected area. Further, since the non-protected data can be recorded onto the hard disk 41, the hard disk 41 is referred to as a non-protected area.

More specifically, the protected data recorded onto the silicon disk 42 corresponds to various function programs that are selected, as programs required to execute the robot-control program, out of the general-purpose OS such as Windows (a registered trademark) NT. The protected data also corresponds to the robot-control program. Further, the robot-control system 10 is provided by the manufacturer thereof, as well as the robot A 71 and the robot B 72 that are subject to control. Further, the above-described protected data is written onto the silicon disk 42 in advance, that is, at the time of shipment. Therefore, when the robot-control system 10 is actually used, the above-described protected data is written onto the silicon disk 42. Further, a user may write additional protected data onto the silicon disk 42. In this embodiment, model data about the robot A and the robot B, and data on the coordinates of a target position to which a hand of the robot A 71 is moved are added, as the additional protected data.

On the other hand, the non-protected data recorded onto the hard disk 41 may be, for example, a user program, execution information (a special variable used for executing a user program, an error log, operation-time information, and so forth), a data-management table 100 and a protect-information table 110 that will be described later, and so forth.

The silicon disk 42 is highly resistant to an impact and/or a vibration. However, if the power is shut down when a data-write operation is performed, data recorded on the silicon disk 42 may be corrupted, as is the case with the hard disk 41. Reduction of the number of times data is written onto the silicon disk 42 (a protected area) helps solving the above-described problem. Therefore, if an instruction to write data onto the silicon disk 42 is issued, the data is not written onto the silicon disk 42, but temporarily written in another storage unit. Then, if a predetermined requirement is fulfilled, the data written in the storage unit is written onto the silicon disk 42. Thereby, if the power is shut down abruptly, the protected data written onto the silicon disk 42 can be protected.

According to this embodiment of the present invention, a write filter is used, so as to achieve the above-described configuration, where the write filter is an existing function of the general-purpose OS. According to the write-filter function, when an instruction to write data into a predetermined storage unit is issued, the data is not written into the predetermined storage unit, but written into a write-filter storage means controlled by the write filter. For example, according to this embodiment, when an instruction to write data into the protected area is issued, the write filter is used, so as to bypass the protected area and write the data into a write-filter area 32. Thus, the use of the existing write filter helps reducing the time and trouble of developing the robot-control program of this embodiment.

The protected data recorded onto the silicon disk 42 is important for safely operating the robot-control system 10. In reality, the protected data needs to be rewritten when the robot-control program provided by the manufacturer is updated at the time of maintenance or the connected robot is changed so that the model data is changed, for example. The above-described procedures should be performed only by a manager distinctive from an ordinary user. In this embodiment, for example, manager mode wherein only an authorized user can manipulate data is provided so that the protected data can be rewritten only when a request to rewrite data is issued in the manager mode. Thereby, it becomes possible to prevent the protected data from being rewritten by the ordinary user. Incidentally, the switch from the operator mode to the manager mode can be made by transmitting a password, for example.

Figure 2:
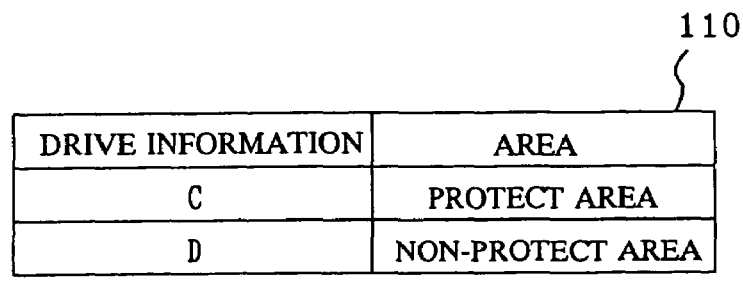
FIG. 2 shows an example protect-information table.
Figure 3:
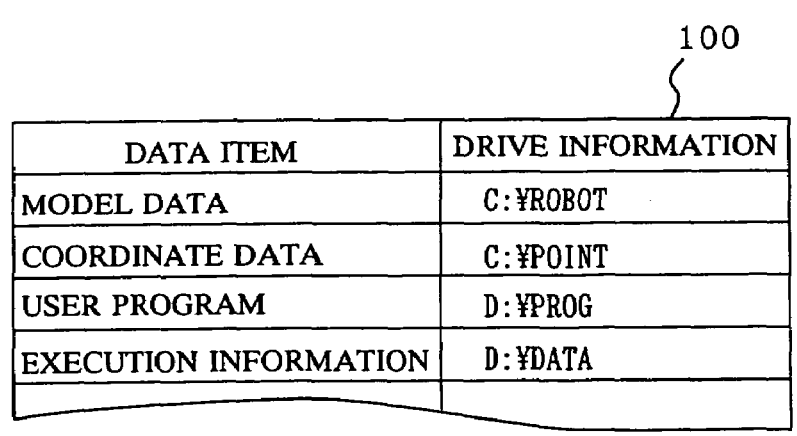
FIG. 3 shows an example data-management table.

Next, the protected-information table 110 and the data-management table 100 that are recorded onto the hard disk 41 will be described. FIG. 2 shows the protected-information table 110 and FIG. 3 shows the data-management table 100. According to this embodiment, the silicon disk 42 corresponds to a C drive and the hard disk 41 corresponds to a D drive.

The protected-information table 110 is provided for determining which storage (drive) should be specified, as the protected area, or the non-protected area. According to this embodiment, the C drive (the silicon disk 42) is specified, as the protected area, and the D drive (the hard disk 41) is specified, as the non-protected area. The protected-information table 110 is prepared in advance by the manufacturer and stored, as a table that cannot be changed by the user.

The data-management table 100 is a table that is provided for specifying storage (a drive) in which the data corresponding to each data item is written and that includes the data item and drive information. Further, the data-management table 100 can be rewritten by the user and the user can arbitrarily specify the write destination for each data. For example, the model data is specified to be written into a directory designated as ROBOT of the C drive (the protected area). That is to say, the model data is designated, as the protected data.

Figure 4:
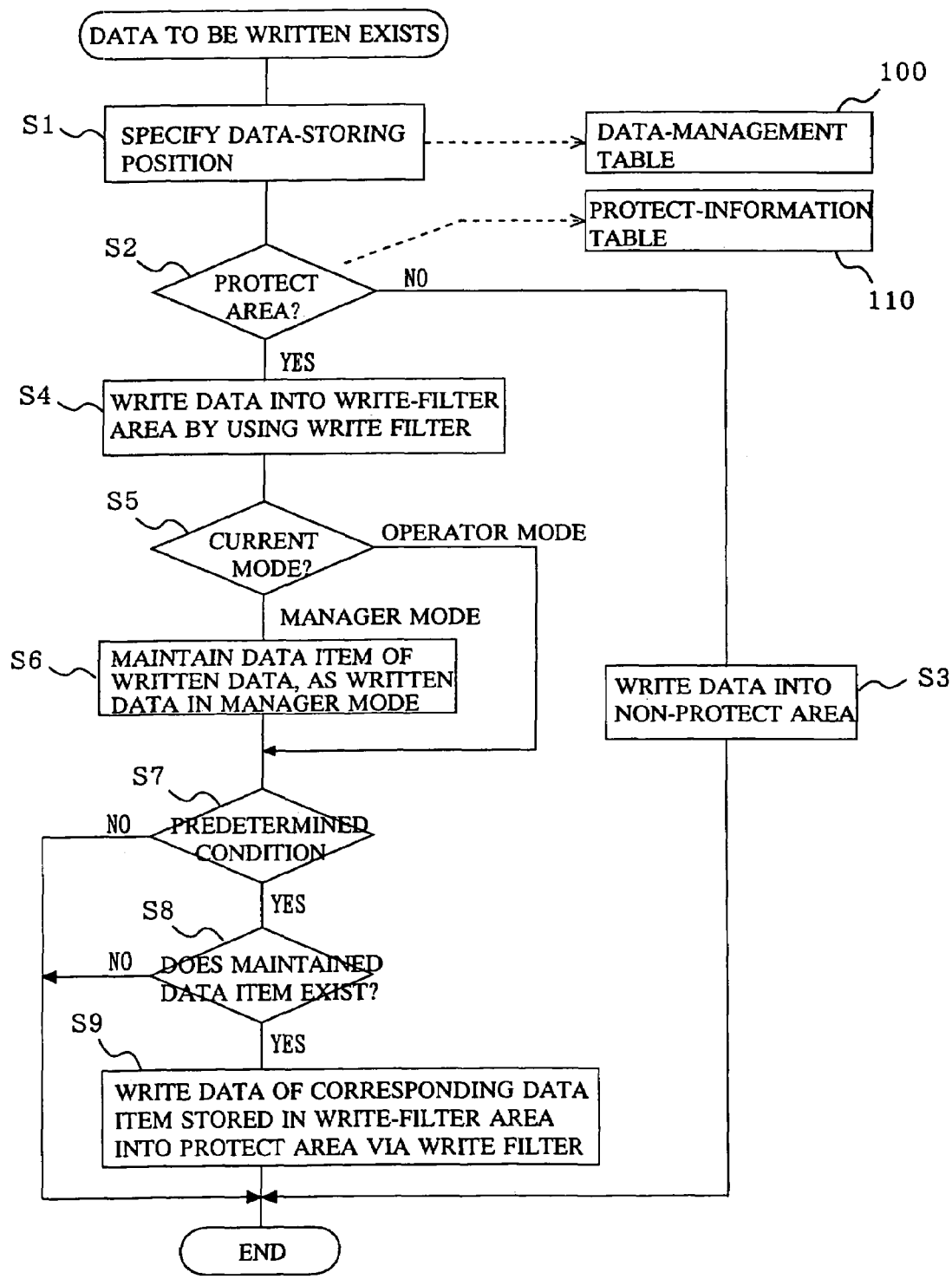
FIG. 4 is a flowchart showing the flow of processing procedures performed when data to be written exists.
Figure 5:
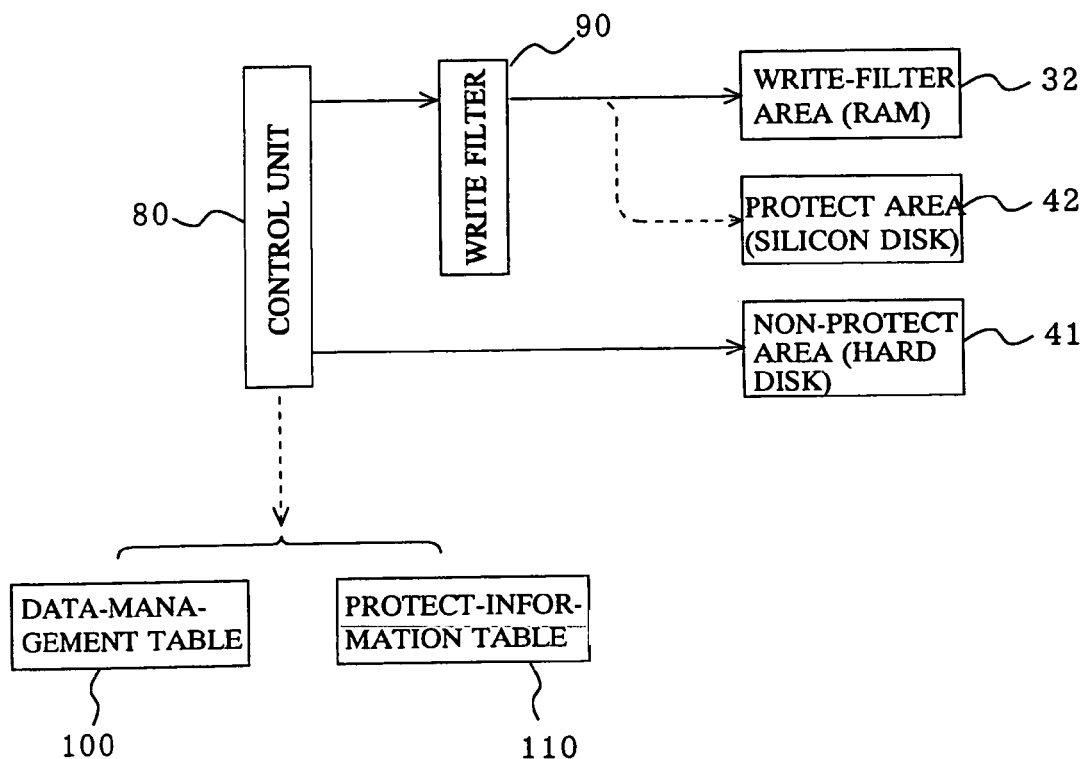
FIG. 5 illustrates data-write operations.

Hereinafter, operations performed at the time of writing operation will be described with reference to FIGS. 4 and 5. FIG. 4 is a flowchart showing the flow of processing procedures performed at the time of writing operation according to the embodiment and FIG. 5 illustrates data-write operations performed according to the embodiment. Further, a control unit 80 shown in FIG. 4 includes a main CPU 20 and at least one program recorded onto the silicon disk 42.

At the time of writing operation, the control unit 80 refers to the data-management table 100 and determines the position where the data to be written is stored on the basis of the item of the written data, at step S1. Then, the control unit 80 determines whether or not the determined storing position is the protected area, at step S2. If it is determined that the storing position is not the protected area, that is, if it is determined that the storing position is the non-protected area, the control unit 80 writes the data to be written into the non-protected area, at step S3.

If it is determined that the storing position is the protected area, the control unit 80 transmits a write instruction to a write filter 90. Upon receiving the write instruction, the write filter 90 temporarily writes the data to be written into a write-filter area 32, at step S4. Not only transmitting the write instruction to the write filter 90, but the control unit 80 also determines the mode which is currently used, at step S5. If the mode is determined to be the manager mode, items of the data to be written are internally maintained, as data to be written in the manager mode, at step S6. If the mode is determined to be the operator mode, the processing corresponding to step S6 is not performed. Thus, when data to be written in the protected area exists, the write filter 90 is used, so as to bypass the protected area and write the data into the write-filter area 32 in reality. Therefore, if the power is shut down during data is rewriting and the rewritten data is corrupted, data that has been stored before the data rewriting is performed remains in the protected area. Therefore, when the power is turned on again, the system can operate on the basis of the data remaining in the protected area. That is to say, if the protected data is updated, as required, initial data that had been written in the protected area is protected.

Then, it is determined whether or not a predetermined requirement (the general-purpose OS is operating without termination by an instruction to shut down the power, for example) is fulfilled, at step S7. If the predetermined requirement is fulfilled, it is determined whether or not the data items maintained at step S6 exists, at step S8. If it is determined that any data item is maintained, the control unit 80 writes data corresponding the data item written into the write-filter area 32 into the protect area via the write filter 90, at step S9. The case where any data item maintained at step S9 exists means the case where the manager mode has been used at the time of data writing at step S4. In this case, the protected data stored in the protected area should be actually updated. Therefore, the data stored in the protected area is rewritten via the write filter 90 on the basis of the data which is temporarily stored in the write-filter area 32.

Figure 6:
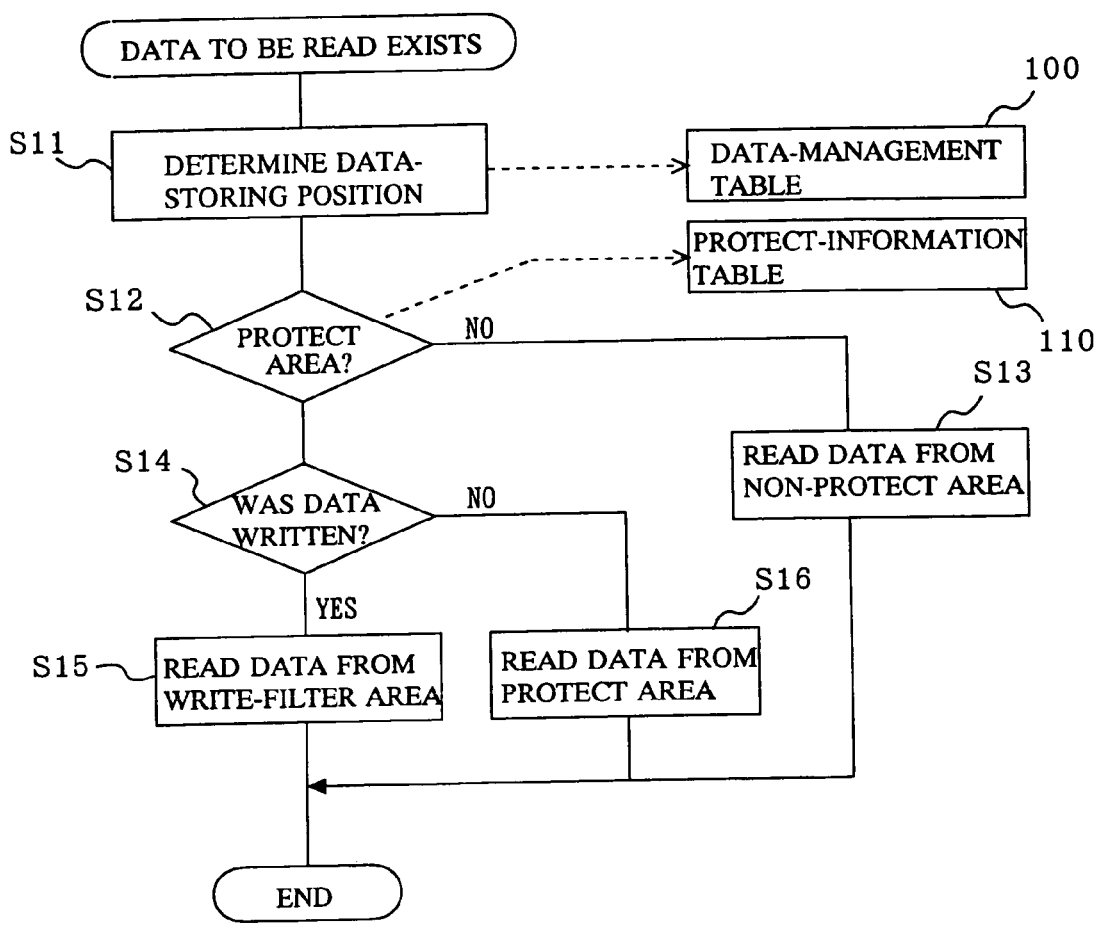
FIG. 6 a flowchart showing the flow of processing procedures performed when data to be read exists.
Figure 7:
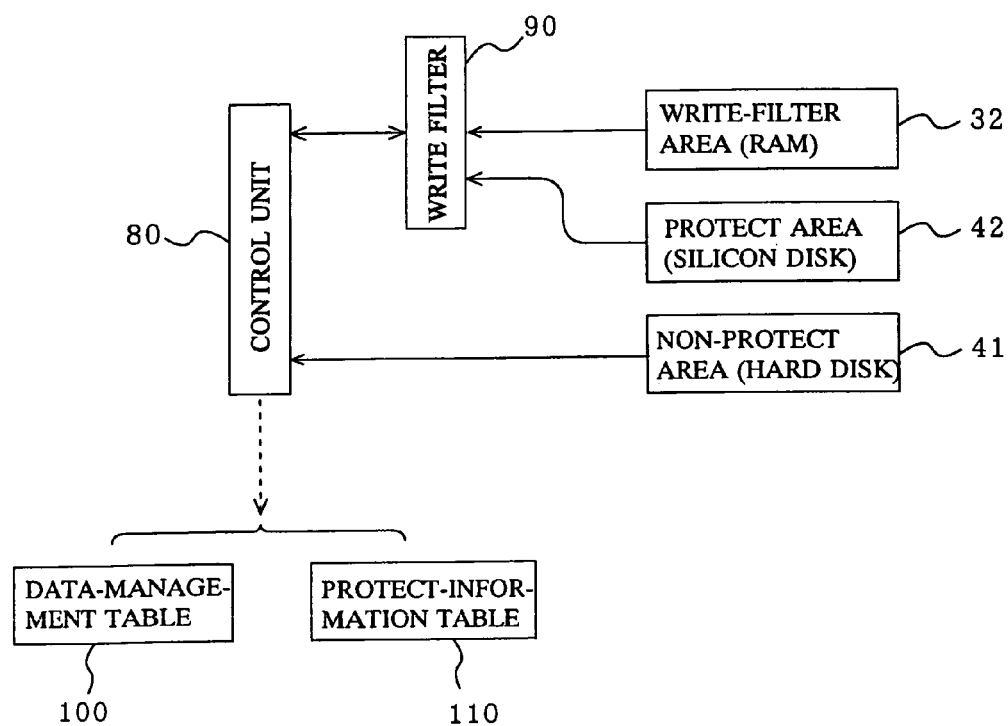
FIG. 7 illustrates data-read operations.

Hereinafter, data reading operation according to the embodiment will be described with reference to FIGS. 6 and 7. FIG. 6 is a flowchart showing the flow of processing procedures performed according to the embodiment, at the time of reading operation. FIG. 7 illustrates the data reading operations performed according to the embodiment.

In reading data, the control unit 80 determines the position where the data is stored on the basis of the item of the data to be read out and the data-management table 100, at step S11, and determines whether or not the determined storing position is in the protected area on the basis of the protected-information table 110, at step S12. If it is determined that the storing position is not the protected area, that is, if the storing position is determined to be the non-protected area, the control unit 80 reads out the corresponding data from the non-protected area, at step S13.

If it is determined that the storing position is the protected area, it is further determined whether or not the above-described data has been written in the protected area, at step S14. If the above-described data has been written in the protected area, the data is read out from the write-filter area 32, at step S15. Otherwise, the data is read out from the protected area, at step S16.

The above-described data writing operation and the data reading operation will be described, as a specific example. Here, coordinate data (data on coordinates of a target position to which a hand of the robot A 71 is moved) which should be protected is changed in the manager mode.

In that case, first, the storing position of the coordinate data is determined to be "C:¥POINT" on the basis of the data-management table 100, at step S1, and the C drive is determined to be the protected area on the basis of the protected-information table 110, at step S2. Then, the coordinate data is written into the write-filter area 32, at step S4. If the power is shut down abruptly at that moment, the data may not be written into the write-filter area 32 normally and the data may be lost. However, since the original coordinate data had been written into the protected area, the original coordinate data stored in the protected area before changing the coordinate data is changed can be protected.

Further, another example where the user erroneously tries to change the model data, which is the protected data, in the operator mode will be considered.

In that case, first, the storing position is determined to be "C:¥ROBOT" by the data-management table 100, at step S1, and the C drive is determined to be the protected area by the protected-information table 110, at step S2. Then, the model data is written into the write-filter area 32, at step S4, and the processing corresponding to step S6 is not performed, since the current mode is the operator mode. Then, if a predetermined requirement is fulfilled, at step S7, it is checked whether or not a maintained data item exists. Since it is determined that the maintained data item does not exist, at step S8, the processing corresponding to step S9 is not performed. Therefore, the model data stored in the protected area is not changed in reality.

However, the model data has been written into the write-filter area 32. Therefore, when the model data is read out by the user without noticing the error, it is determined that data has been written at step S14, and the model data that the user has erroneously tried to change is read out from the write-filter area 32. However, if the user notices the error, the power is shut down so that the data stored in the write-filter area 32 is deleted. Therefore, when the power is turned on again, the system can be operated on the basis of correct model data written in the protected area.

Thus, according to the embodiment, the highly reliable silicon disk 42 is used in place of the known hard disk. Therefore, it becomes possible to prevent data from being lost and construct the highly reliable robot-control system 10.

According to the embodiment, data (including a program) that should be protected with reliability is recorded onto the silicon disk 42 and other data is recorded onto the hard disk 41 in consideration of problems caused by the storage capacity and cost of the currently used silicon disk 42. Therefore, it becomes possible to solve the above-described problems and construct the highly reliable robot-control system 10.

Further, when data is written into the protected area, the write filter 90 is used, so as to bypass the protected area and write the data into the write-filter area 32 in reality. Therefore, if the power is shut down at the time of rewriting operation and the rewritten data is corrupted, initial data that was stored before rewriting the data is protected or maintained in the protected area. Therefore, when the power is turned on again, the system can operate on the basis of the data maintained in the protected area.

Further, the system is configured so that it is difficult for the user to rewrite the protected data (data writing into the protected area) in the operator mode. Therefore, it becomes possible to reduce the risk of an ordinary user rewriting the protected data by mistake.

The write-filter area 32 includes volatile memory. Therefore, if the user writes data into the write-filter area 32 by mistake, the contents of the write-filter area 32 can be deleted by shutting down the power. Subsequently, when the system is started next time, it can operate on the basis of data stored in the protected area.

Since the user can arbitrarily designate each data item as the protected data, or the non-protected data according to the data-management table 100, the user can customize data according to the form in which the robot-control system 10 is used. For example, when the user wants to designate a registry as the protected data, the user writes the registry into the protected area. Further, the user writes the "registry" into "data item" of the data-management table 100 and "C:¥" representing a drive designated as the protected area into "drive information". If the registry is erroneously changed, there is possibility that the system can not start, for example. Therefore, the registry should be designated as the protected data.

Further, the manager mode is prepared so that the protected data stored in the protected area can be rewritten in the manager mode. Therefore, it becomes possible to achieve upgradability at the development time and maintainability at the maintenance time.

Further, although the robot-control system 10 has been described in this embodiment, the present invention can also be used for a controller which should be reliable, so as to control a unit for control by using a control program running on the general-purpose OS. For example, the present invention can be used for a semiconductor-test device, a vision-test device, and so forth.

Further, the non-volatile solid-state memory is not limited to the silicon disk (flash ROM).

Further, according to the above-described embodiment, the flow of the data-write operations is described on the assumption that the user stores (rewrites) data by intention. However, without being limited to the above-described embodiment, data may be explicitly stored by a user program, or automatically stored by the robot-control program, as is the case with the execution information.

What is claimed is:

1. A control system configured to control a predetermined unit by using a control program running on a general-purpose operating system, the control system comprising:
    an auxiliary storage device configured to store the general-purpose operating system, the control program, and various data required for the control program to run;
    a main storage device on which each of the general-purpose operating system and the control program is loaded when the general-purpose operating system and the control program are executed,
    wherein the auxiliary storage device includes non-volatile solid-state memory functioning as a protected area and another memory device functioning as a non-protected area, and
    wherein at least various function of programs of the general-purpose operating system, where the various function programs are required for the control program to run on the general-purpose operating system, and the control program are stored in the protected area, as protected data;
    a write-filter storage means configured to write and read data under the control of a write filter of the general-purpose operating system; and
    a control means configured, to perform control so that the data is not written into the protected area, but written into the write-filter storage means by using the write filter at the time of writing operation of data to be written into the protected area,
    wherein when mode set at the time of writing operation of the data into the protected area is manager mode in which an authorized user can operate the writing, the control means writes the data written into the write-filter storage means into the protected area via the write filter, provided that a predetermined condition is fulfilled,
    a table that can be rewritten by the user, where an item of data and information showing whether the data corresponding to the data item should be stored in the protected area or the non-protected area are set to the table,
    wherein the control means determines a destination of the data to be written with reference to the table according to the data item corresponding to the data to be written, at the time of writing operation.

2. The control system according to claim 1, wherein the write-filter storage means is an area for the write filter provided in the main storage device constituted by volatile memory.

3. The control system according to claim 1, wherein the non-volatile solid-state memory includes a flash read-only memory.

4. The control system according to claim 1, wherein the unit to be controlled is a robot.

5. The control system according to claim 1, wherein the non-volatile solid-state memory includes a flash read-only memory.

6. The control system according to claim 1, wherein the unit to be controlled is a robot.

7. A control system configured to control a predetermined unit by using a control program running on a general-purpose operating system, the control system comprising:
  an auxiliary storage device configured to store at least the general-purpose operating system, the control program, and various data required for the control program to run; and
  a main storage device on which each of the general-purpose operating system and the control program is loaded when the general-purpose operating system and the control program are executed,
  wherein the auxiliary storage device includes a non-volatile solid-state memory functioning as a protected area and another memory device functioning as a non-protected area, and
  wherein at least various function of programs of the general-purpose operating system, where the various function programs are required for the control program to run on the general-purpose operating system, and the control program are stored in the protected area, as protected data,
  a write-filter storage means configured to write and read data under the control of a write filter of the general-purpose operating system; and
  a control means configured, to perform control so that the data is not written into the protected area, but written into the write-filter storage means by using the write filter, at the time of writing operation of data to be written into the protected area,
  wherein when mode set at the time of writing operation of the data into the protected area is manager mode in which an authorized user can operate the writing, the control means writes the data written into the write-filter storage means into the protected area via the write filter, provided that a predetermined condition is fulfilled,
  wherein at the time of reading operation, the control means determines whether or not the data to be read has been written into the write-filter storage means, and wherein if it is determined that the data to be read from the write-filter storage means, and if it is determined that the data to be read has not been written into the write-filter storage means, the control means reads the data to be read from the protected area.

8. The control system according to claim 7, wherein the write-filter storage means is an area for the write filter provided in the main storage device constituted by volatile memory.

* * * * *

UNITED STATES PATENT AND TRADEMARK OFFICE
CERTIFICATE OF CORRECTION

PATENT NO. : 7,478,207 B2
APPLICATION NO. : 11/357797
DATED : January 13, 2009
INVENTOR(S) : Taishi Nogami It is certified that error appears in the above-identified patent and that said Letters Patent is hereby corrected as shown below:

Column 2, Line 51: "non-producted" should be --non-protected--

Column 2, Line 67: "read", first occurrence, should be --reads--

Column 3, Line 1: after "it" insert --is--

Column 3, Line 23: after "6" insert --is--

Column 6, Line 18: after "corresponding" insert --to--

Column 8, Line 29: after "store" insert --at least--

Column 10, Line 22: after "read", insert --has been written into the write-filter storage means, the control means reads the data to be read--

Signed and Sealed this

Second Day of June, 2009

JOHN DOLL
*Acting Director of the United States Patent and Trademark Office*